United States Patent
Chen

(10) Patent No.: US 6,799,750 B2
(45) Date of Patent: Oct. 5, 2004

(54) FRAME FOR A GRADUALLY RELEASED TENSION MACHINE

(75) Inventor: Weiguo Chen, Ningbo (CN)

(73) Assignee: Ningbo Xuli Metal Products Co., Ltd., Ningbo (CN)

( * ) Notice: Subject to any disclaimer, the term of this patent is extended or adjusted under 35 U.S.C. 154(b) by 0 days.

(21) Appl. No.: 10/162,072

(22) Filed: Jun. 5, 2002

(65) Prior Publication Data

US 2003/0193046 A1 Oct. 16, 2003

(30) Foreign Application Priority Data

Apr. 12, 2002 (CN) ........................................ 02216792 U

(51) Int. Cl.[7] ............................ B21F 9/00; B25B 25/00; B66F 3/00
(52) U.S. Cl. ........................ 254/218; 254/243; 24/68 R; 24/69 ST; 24/71 ST
(58) Field of Search .................................. 254/217, 218, 254/243; 24/68 R, 70 ST, 69 ST, 69 CT, 71 ST

(56) References Cited

U.S. PATENT DOCUMENTS

| | | | | |
|---|---|---|---|---|
| 5,103,536 A | * | 4/1992 | Kamper | 24/68 CD |
| 5,205,020 A | * | 4/1993 | Kamper | 24/68 CD |
| 5,855,045 A | * | 1/1999 | Miura | 24/68 CD |
| 5,946,742 A | * | 9/1999 | Parker | 4/458 |

* cited by examiner

Primary Examiner—Emmanuel M Marcelo
(74) Attorney, Agent, or Firm—Rabin & Berdo, P.C.

(57) ABSTRACT

A frame constitutes the main part of a gradually released tension machine, which is a kind of tool for tensioning and releasing cargo binding strips by hand, and which also comprises a ratchet and an operating handle. On the edge of the frame is a locking slot and a loosening slot, and a releasing slot near the loosening slot. The frame also has a slow-release device comprising the releasing slot and a sliding gear which is used in combination with the ratchet of the tension machine and is rotatably fixed in proximity to the releasing slot, such that the tip of the sliding gear overlaps the releasing slot and is substantially even with the teeth of the ratchet. The frame is simple and can be easily manufactured. Utilizing this kind of frame, the releasing effect is much better, and the tension machine has greatly improved reliability and safety.

5 Claims, 3 Drawing Sheets

FRAME FOR A GRADUALLY RELEASED TENSION MACHINE

FIELD OF THE INVENTION

This invention relates to a kind of tool for binding by hand, and specifically to a fame which constitutes the main part of a gradually released tension machine. The tension machine which includes the frame is especially suitable for binding cargo firmly for transporting and shipment so as to prevent the sudden falling of the cargo during operation of the tension machine.

BACKGROUND OF THE INVENTION

Chinese Patent Application No. 01274274.0, namely, Twice Released Tension Machine, provides not only a tension function but also a gradually released function, but its frame is not considered perfect yet

SUMMARY OF THE INVENTION

The object of the invention is to provide a frame for a gradually released tension machine with a reasonably perfect design. Using the frame on the gradually released tension machine, the machine has its ordinary functions as well as a slow-release function, and the releasing effect is much better, which can guarantee safety and reliability during the discharging of cargo.

To achieve this object, the invention provides a frame for a gradually released tension machine. At the edge of the frame there is a locking slot and a loosening slot. A releasing slot is near the loosening slot. The frame also has a slow-release device comprising the releasing slot and a sliding gear which works in combination with the ratchet of the tension machine and is rotatably mounted at the side of the releasing slot, such that the outer tip of the sliding gear is substantially even with the teeth of the ratchet.

Compared to its counterpart in the prior art, the frame according to the invention has the advantage that by adding a slow-release device comprising a slideway with arc shape as the releasing slot at the head of the frame, and a sliding gear which works in combination with the ratchet and is rotatably mounted at the side of the releasing slot, the tension machine can release step by step. By rocking the baffle of the tension machine back and forth in the releasing slot, the ratchet will slacken tooth by tooth, and consequently the binding strip will release a by the length of a tooth pitch little by little, and the binding strip will slacken slowly, until the tensile force of the binding strip is small. Fixing the baffle in the loosening slot, the ratchet will be in the complete released condition, safely slackening the binding strip, and the cargo can be untied. Gradual step by step release of the tensile force of the binding strip can prevent sudden loosening, sloping and collapsing of cargo that can hurt persons and damage the cargo. The machine is simple and can be easily manufactured, only adding a simple part, namely a sliding gear. Choosing this kind of frame to use in the tension machine, the releasing effect is much better, and greatly improves its reliability and safety. It is an ideal part for updating tension machines.

DETAILED DESCRIPTION OF THE INVENTION

Figure 1:
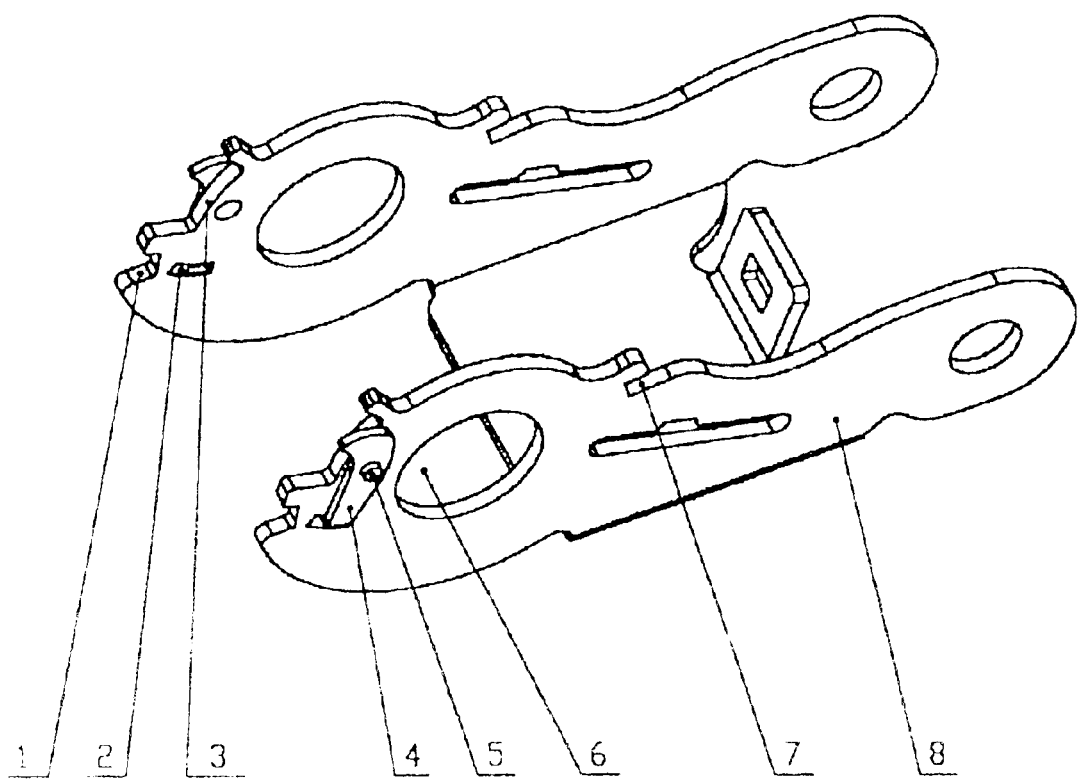
FIG. 1 is a schematic drawing of the structure of the invention.
Figure 2:
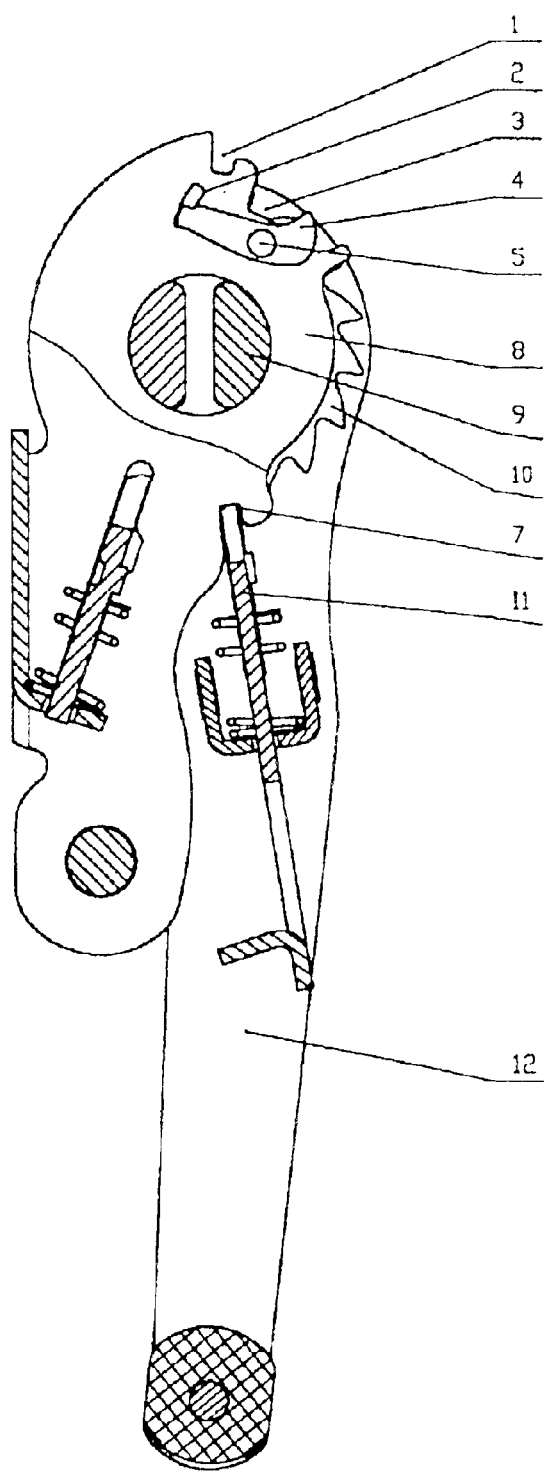
FIG. 2 is a using state drawing of the invention.

The invention may best be understood by referring to the following detailed description and accompanying drawings which illustrate the invention.

Referring to FIG. 1 to FIG. 3e, the frame 8 has a middle section that is U-shaped and two ends that are open without a bottom. On each side, there is a big through hole at one end, a small through hole at the other end and a strip-shaped slot in the middle section. Along the edge of each side of the frame 8, around the periphery of the big through hole 6, there is a loosening slot 1, a releasing slot 3 beside it, and a locking slot 7 on the opposite side of the releasing slot 3 from the loosening slot 1. In addition, there is a mounting hole and an arc-shaped fixing slot 2 on each side of the frame 8, in the vicinity of the releasing slot 3, for rotatably fixing the sliding gear 4.

The sliding gear 4 has a through hole is in its, middle for rotatably mounting it to the frame 8. One end of the sliding gear 4 is arc-shaped to work in combination with the ratchet 10, as explained below, and the other is bent to engage fixing slot 2.

The releasing slot 3 is an arc-shaped slideway at the edge of the frame 8. Its arc direction is the same as that of the ratchet 10, and their shapes are matching. The length of the arc is twice to three times as that of the tooth of the ratchet 10.

The rivet 5 is used to fix the sliding gear 4 in the mounting hole near releasing slot 3 at the edge of the head of the frame 8, and simultaneously position the bent end of the sliding gear 4 in the fixing slot 2 on the frame 8. The sliding gear 4 can turn round the rivet 5 and work in combination with the ratchet 10, the arc-shaped tip of the sliding gear 4 being substantially even with the teeth of the ratchet 10.

The two semiaxes 9 are utilized to connect the frame 8 having the releasing device with the ratchet 10 and the handle 12 as an integral unit, which is then assembled with other parts as to comprise the gradually released tension machine.

Figure 3A:
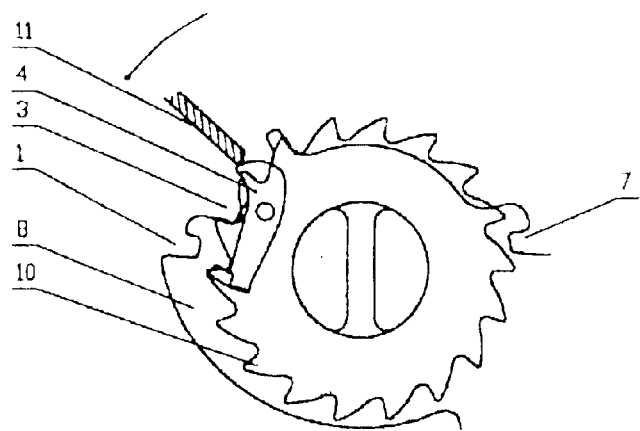
FIG. 3a to FIG. 3e are schematic drawings of the releasing process.
Figure 3B:
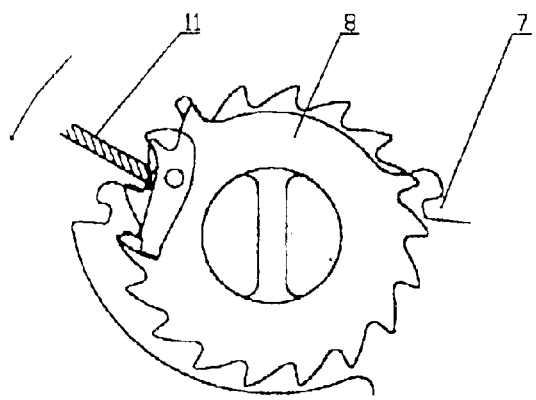
Figure 3C:
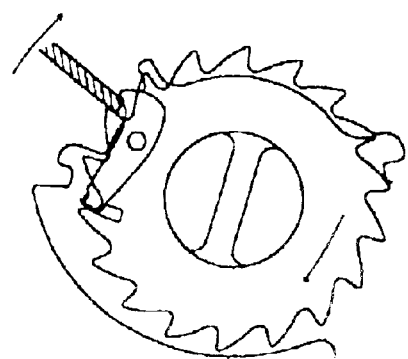
Figure 3D:
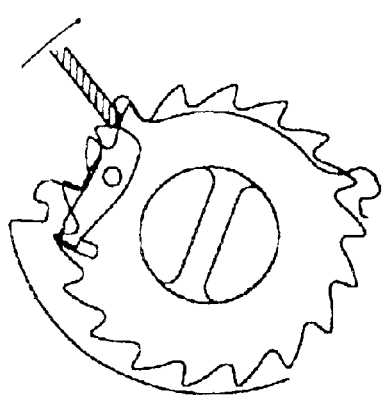
Figure 3E:
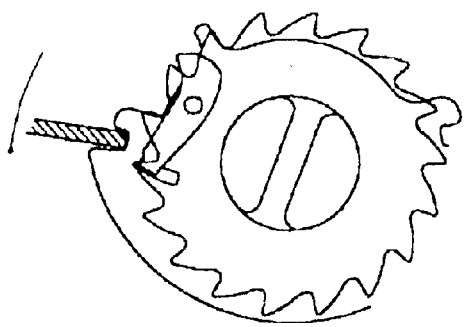

To discharge cargo and loosen the binding strip, the handle 12 of the tension machine is first pulled to pull out the baffle 11 from the locking slot 7, then the handle 12 is turned to put the baffle 11 in the releasing slot 3, and as the handle 12 is further pushed, the baffle 11 slides in the anticlockwise direction along the releasing slot 3 and slides over the arc-shaped tip of the sliding gear 4, as show in FIG. 3a. Continuing to push the handle 12 makes the baffle 11 slide in the anticlockwise direction till it reaches the bottom of the releasing slot 3, as show in FIG. 3b. The ratchet 10 turns in the clockwise direction under the action of the pulling force of the binding strip, its teeth push the baffle 11 to slide in the clockwise direction along the releasing slot 3 till coming into contact with the sliding gear 4 and embedding between the teeth of the ratchet 10 and the sliding gear 4, as show in FIG. 3c. As the handle 12 is further pulled in the clockwise direction, the baffle 11 pushes the sliding gear 4 to get over the tip of it and slides into the releasing slot 3 till it comes up against the slot side and is withstood, and the binding strip is loosened by the length of a tooth pitch, as show in FIG. 3d.

Repeating the above operation, the ratchet 10 turns backwards in the clockwise direction tooth by tooth, the binding strip is also slackened. If the baffle 11 is inserted in the loosening slot 1, the strip is completely loosened. Pulling the binding strip, the ratchet 10 turns together with the two semiaxes 9, the binding strip comes out from the two semiaxes 9, and the cargo is untied, as show in FIG. 3e.

I claim:

1. A frame for a gradually released tension machine, comprising:
    a U-shaped main body having a center section, a first end section and a second end section opposite the first end section, the first end section having a through hole in each side for rotatably mounting a ratchet with teeth for tensioning a binding strip, each side of the first end section also having an arc-shaped release slot formed on an edge thereof proximate to the periphery of the through hole therein; and
    a sliding gear rotatably fixed on each side of the first end section so as to have one end overlapping the corresponding release slot and extending substantially even with the teeth of the ratchet, the sliding gear being used in combination with the teeth of the ratchet to provide slow release of the binding strip.

2. A frame according to claim 1, wherein the arc of the release slot on each side of the first end section has a matching shape and direction to that of the teeth of the ratchet, and wherein the release slot has an arc length that is two to three times that of the teeth of the ratchet.

3. A frame according to claim 1, wherein the end of the sliding gear which overlaps the releasing slot is arc shaped, and the other end is bent, and wherein each side of the first end section has a pivot proximate to the releasing slot for rotatably fixing the corresponding sliding gear, and an arc-shaped fixing slot therein to engage the bent end of the sliding gear.

4. A frame according to claim 1, wherein the second end section has a through hole in each side for rotatably mounting a handle, the handle having a baffle slidably affixed thereto to engage the ratchet in combination with the sliding gear on each side of the frame when the handle is used to provide slow release of the binding strip.

5. A frame according to claim 4, wherein each side of the first end section also formed on its edge a locking slot to engage the baffle when the binding strip is completely tensioned and a loosening slot to engage the baffle when the binding strip is completely slack, the locking slot and the loosening slot being located at opposite ends of the releasing slot.

* * * * *